March 31, 1953 F. H. S. ROSSIRE 2,633,315
FLIGHT CONTROLLER FOR AUTOMATIC PILOTS
Filed Oct. 9, 1947
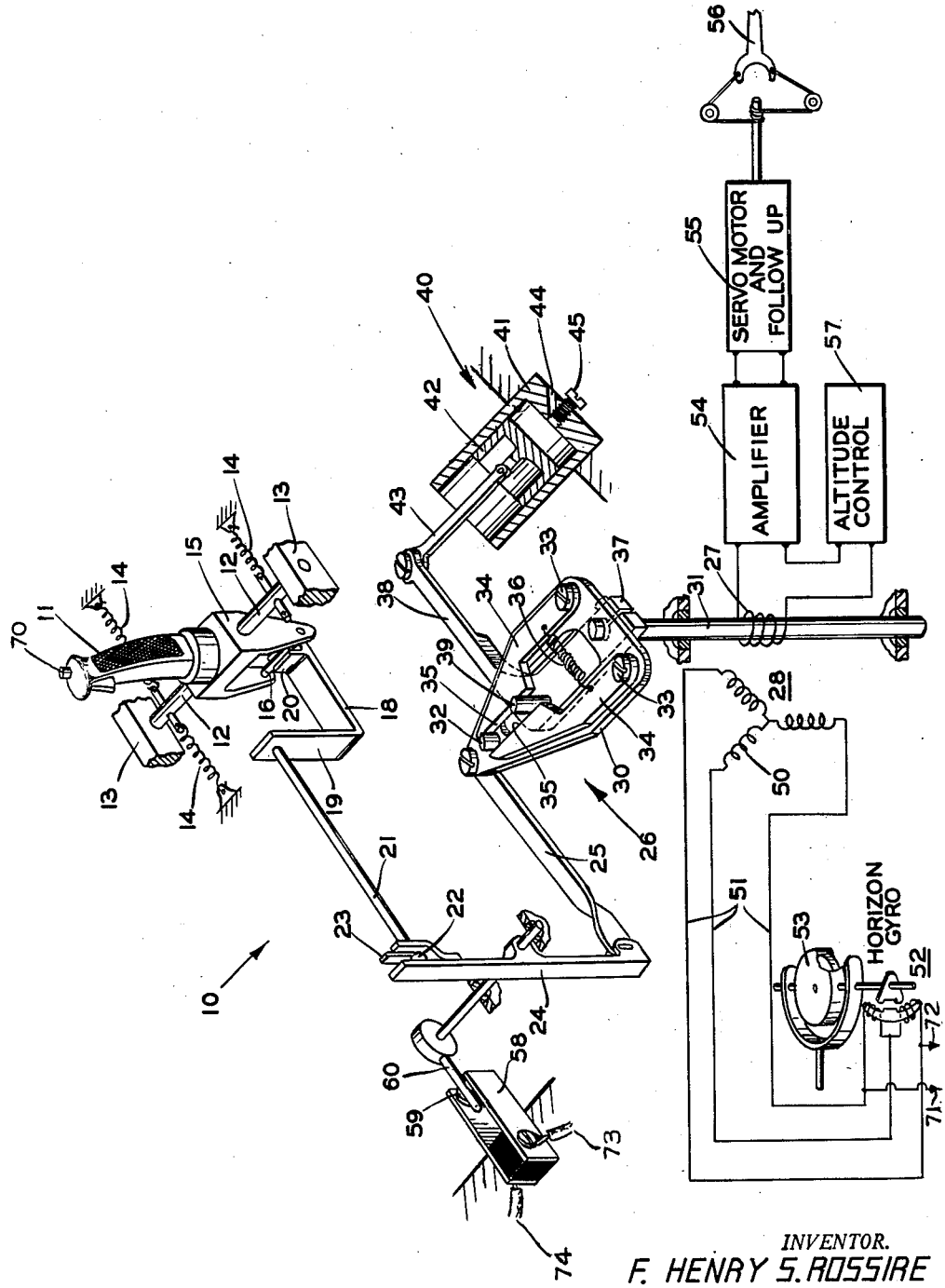
INVENTOR.
F. HENRY S. ROSSIRE
BY
-ATTORNEY- Patented Mar. 31, 1953

2,633,315

UNITED STATES PATENT OFFICE 2,633,315

FLIGHT CONTROLLER FOR AUTOMATIC PILOTS

Francis Henry S. Rossire, Leonia, N. J., assignor to Bendix Aviation Corporation, Teterboro, N. J., a corporation of Delaware Application October 9, 1947, Serial No. 778,885

14 Claims. (Cl. 244—77)

This invention relates to automatic pilot systems for aircraft, and more particularly to a means for improving the pitch control of an aircraft in response to the positioning of a flight controller.

This is a continuation-in-part of my copending application for a Flight Controller for Automatic Pilot bearing Serial No. 729,019, filed on February 17, 1947.

In my aforesaid copending application I provided manual means for controlling the flight of an aircraft through an automatic pilot system; the release of the controlling means permitting the pilot system to resume control of the aircraft. The controlling means comprised a control stick freely movable about two mutually perpendicular axes corresponding to the bank and pitch axes of the aircraft, for actuating simultaneously three inductive elements of the pilot system, one of said elements being provided in each of the control channels. The inductive elements constituted synchronous receivers of three telemetering systems, the transmitters of which were actuated by the precession of an artificial horizon gyroscope about the pitch and bank axes, and by an earth inductor compass system. The actuation of the inductive elements by movement of the control stick varied the signals developed in the pilot system to permit control of the aircraft by the movement of the control stick. Release of the control stick permitted the resilient means provided, to return the stick and the inductive elements to a neutral position, the automtic pilot system taking over the control of the aircraft.

It has been found that upon release of the control stick and its return to neutral position by the centering springs during a climb or dive maneuver, the aircraft leveled off quite rapidly due to the large pitch signals being suddenly impressed on the elevator operating motors. The sharp leveling off of the aircraft was extremely objectionable, particularly when commercial aircraft was involved.

An object of my present invention, therefore, is to provide a flight controller in which the control of an aircraft about its pitch axis is gradually returned to the automatic pilot system upon release of the control stick.

A further object of my invention is to provide in a flight controller means for retarding the return of the inductive element to its neutral upon release of the control stick.

Another object of the invention is to provide a time delay mechanism for the inductive element which will permit unrestricted movement of the control stick to control the aircraft about its pitch axis.

Still another object of my invention is to provide a flight controller in which the altitude control unit of the automatic pilot system is disconnected when the control stick thereof is moved to control the aircraft about its pitch axis.

Other objects of this invention will in part be obvious, and in part hereinafter pointed out.

In the single figure of the drawing forming a part of this specification, in which one of the various possible illustrative embodiments of this invention is shown in perspective, together with a schematic wiring diagram of the pitch axis control channel of an automatic pilot system; the numeral 10 designates a flight controller having a control stick 11, provided with a switch operating button 70 therein, and being oscillatory about a transverse axis formed by the trunnions 12 mounted in suitable bearing surfaces 13. Return springs 14 are provided suitably fastened to the trunnions and to the enclosure (not shown) of the flight controller to return the control handle to the neutral position shown. It will be apparent from the parent application enumerated, that control handle 11 may also be oscillated about the longitudinal axis of the flight controller 10.

Integral with the control handle 11 is a bifurcated, dependent member 15 carrying the trunnions 12 and provided with a short transverse rod 16 at the lower edge of said member and spanning the opening therein. Coacting with said handle is a bracket 18 having an upstanding arm 19 at one end, and a small forked member 20 at the other end. The rod 16 rests in the fork 20 of the bracket so that movement of the control handle 11 will be transmitted by said rod to the bracket.

Fixed to the upper end of arm 19 is a rod 21 having a ball 22 provided on the free end thereof. The rod 21 rests in a bifurcated member 23 fixed to the upper end of a suitably pivoted lever 24. The ball 22 on said rod rests between the lever and the bifurcated member forming a ball and socket connection, between said lever and the bracket. The lower end of the lever 24 has pivoted thereto a link 25, the other end of said link being pivoted to a time delay or lost motion mechanism 26 for positioning the rotor winding 27 of a synchronous receiver 28 of the automatic pilot system.

The mechanism 26 comprises a lever 30 pivoted to the link 25 at one end and rotatably mounted at the other end on the shaft 31 of the rotor 27. Fixed to said lever near the pivoted end thereof is a pin 32. Pivotally mounted at the other end of the lever, as by screws 33, are two centering levers 34; the free ends of which are provided with facing straight edges 35 forming jaws to clamp the pin 32. A coil spring 36 interconnects the levers 34 to clamp the pin 32.

Fixed to the rotor shaft 31 below lever 30 is a second lever 37 formed like a bellcrank having an outwardly extending arm 38. An upstanding pin 39 is fixed in the lever 37 and extends upwardly through the lever 30. The pin 39 is clamped between the straight edges 35 of the clamping levers 34 maintaining the two levers 30 and 37 in alignment.

The oscillation of control handle 11 will be transmitted by the rod 16 to the bracket 18. The rod 21 will be moved longitudinally to rock the pivoted lever 24. The lever 24 in turn will move the link 25 to rotate the rotor shaft 31 through the levers 30 and 37 by way of spring 36 and pins 32 and 39. A sharp movement of the control handle 11 will rotate the lever 30, prying open the clamping levers 34 slightly against the action of the spring 36. The spring 36 will, however, immediately close the levers 34 so that pins 32 and 39 are clamped thereby to align the levers 30 and 37 to rotate the rotor shaft 31. The lag between the movement of the lever 30 and lever 37 in response to the control handle is extremely slight.

To increase the time of response of the rotor shaft 31 to control handle movement, a dash pot 40 is provided having a cylinder 41 and a piston 42. The piston 42 is pivotally connected by way of a link 43 to the arm 38 of lever 37. A vent 44 is provided in the cylinder having a screw 45 for controlling the size of the vent. Movement of lever 37, and consequently rotor shaft 31, will be retarded by the action of the dash pot 40. Movement of the control handle 11 about trunnions 12 will rotate the lever 30 causing the clamping levers 34 to be opened due to the action of the dash pot on lever 37. The spring 36 will bring the clamping levers together again to align pins 32 and 39 as the air is drawn into or expelled from the cylinder 41. Thus the delayed response of the lever 37 to the movement of the control handle 11 will retard the movement of the receiver rotor 27. Thus rapid changes about the pitch axis heretofore found objectionable are eliminated when the present flight controller is used in an automatic pilot system.

In the single figure of the drawing I have illustrated the elevator control channel only of an automatic pilot system. The receiver 28 has its stator 50 connected by leads 51 to a pick-off device 52 actuated by the precession of the artificial horizon gyroscope 53 about its pitch axis. A source of suitable A. C. power is connected to two of the leads 51 by way of leads 71 and 72.

The signal voltages induced in the pick-off device 52 appear in the rotor winding 27 of the receiver. The voltages are thereupon impressed on the input stage of a conventional amplifier and phase discriminator 54, the output of which operates a servomotor and follow-up signal generator 55. The servomotor operates in the proper direction to deflect the elevators 56 a proper amount in accordance with the signal voltages impressed upon the amplifier 54.

It will be readily apparent that the rotation of the receiver rotor 27 by movement of the control handle 11 will vary the flux linkage between the rotor and the stator 50. This variation in the flux linkage will determine the phase and amplitude of the signal voltage induced in the rotor winding. Thus by movement of the control handle, the aircraft on which the system is mounted, is controlled by the spurious signal voltages thus developed in the rotor. With the addition of the time delay mechanism 26 violent changes in pitch attitude of the aircraft are eliminated from the flight controller more fully described in my aforesaid application. This is particularly true when the control handle 11 is released and snapped back to its neutral position by the centering springs 14. In normal flight, movement of the control stick 11 is usually done in slow and easy stages, the drag of the dash pot 40 on lever 37 having little, if any, effect on the mechanism 26. The retarding effect, of course, can be readily varied by changing the opening of the vent 44 by turning of the screw 45. Rapid changes in pitch, however, have been eliminated by the structure described.

In the automatic pilot system illustrated, I have illustrated an altitude controller 57 in block diagram connected in series with the receiver rotor 27. The altitude controller, as is well known and therefore not illustrated, comprises a barometric unit actuating a signal generating device, usually a rotary transformer. A magnetic clutch and centering device is normally incorporated in the controller for disconnecting the signal device from the barometric unit and for centering the signal device in its no signal position. This feature of the controller is desirable when making landing approaches, or in take-offs.

The signals developed by the altitude controller upon a change in altitude of the aircraft from that preset, will operate the elevator servomotor through the amplifier 54 to maintain the aircraft at the preselected level. Reference may be made to either of the copending applications for altitude controllers filed by Divoll bearing Serial No. 660,342, now Patent No. 2,474,618, which issued on June 28, 1949, and by Nixon bearing Serial No. 660,343 on April 8, 1946.

In controlling the flight of the aircraft about its pitch axis by the movement of the control stick 11, it is desirable to eliminate the source of altitude signal voltages of the controller 57. To this end a two bladed switch 58 is provided having a movable contact 59 therebetween engaging both blades of the switch. The switch 58 is in series in the energizing circuit of the magnetic clutch of the controller 57 by way of leads 73 and 74. The contact 59 is carried by an arm 60 movable with the pivotable lever 24. Movement of the lever will swing the contact 59 from between the switch blades opening the energizing circuit of the magnetic clutch. The clutch will thereupon be deenergized uncoupling the signal generator and permitting its return to zero signal position. The pilot system is then operative by the signals developed by the angular displacement of the rotor 27 of the receiver.

It will thus be seen that there is now provided a flight controller in which the several objects of this invention are achieved and which is well adapted to meet all conditions of practical use.

As various possible embodiments of the above invention may be made, and as various changes may be made in the embodiment set forth above, it will be understood that all matter herein set forth, or illustrated in the accompanying drawing, is to be interpreted as illustrative, and not in a limiting sense.

Having thus described my invention, I claim as new and desire to secure by Letters Patent:

1. In a flight controller for an automatic pilot system having an elevator actuating motor and an altitude controller, the combination of a pitch signal developing device for operating the actuating motor, a shaft for said device for actuating the same, a lever rotatably mounted on said shaft, a second lever fixed to said shaft, a pin in each of said first and second levers, resiliently biased clamping means on said first lever for engaging said pins, a control stick linked to said first lever for rotating said shaft through said clamping means, pins and second lever upon movement thereof, a dash pot operatively connected to said second lever, and a switch operative upon movement of said control stick from an initial position to disconnect the altitude controller from the pilot system.

2. In an automatic pilot system having an elevator actuating motor, the combination of a pitch signal developing device, an inductive receiver for the pitch signals of said device, an altitude controller, electrical means interconnecting said receiver and said altitude controller with the elevator actuating motor to operate the same in accordance with the pitch and altitude signals thereof, means for varying the flux linkage of said receiver to operate the actuating motor by the resulting spurious signals, said means including a time delay to retard the change in flux linkage of the receiver upon actuation thereof by the varying means, and means operative by said varying means to disconnect the altitude controller from the pilot system.

3. In a flight controller for an automatic pilot system having an elevator actuating motor and an altitude controller, the combination comprising a pitch signal developing device in series with the altitude controller for operating said actuating motor, a manually movable member for operating said device upon movement thereof from an initial position, a time delay mechanism interconnecting said member and said device to retard the return of said member to its initial position upon release thereof, and a switch operable upon movement of said member from its initial position to disconnect said altitude controller.

4. In a flight controller for an automatic pilot system having an elevator actuating motor, the combination of a pitch signal developing device for operating the actuating motor, a shaft for said device, a lever rotatably mounted on said shaft, clamping arms on said lever, a second lever fixed to said shaft, alignment pins on said first and second levers and resilient means interconnecting said clamping arms for aligning said first and second levers by abutment with said alignment pins, a control stick linked to said first lever for oscillating said shaft by said second lever through said resilient means upon movement thereof, and a damping device fixed to said second lever to retard the motion imparted thereto by said first lever.

5. In a flight controller for an automatic pilot system having an elevator actuating motor and an altitude controller, the combination of a pitch signal developing device for operating the actuating motor, a shaft for said device, a lever rotatably mounted on said shaft, clamping arms on said lever, a second lever fixed to said shaft, alignment pins on said first and second levers and resilient means interconnecting said clamping arms for aligning said first and second levers by abutment with said alignment pins, a control stick linked to said first lever for oscillating said shaft by said second lever through said resilient means upon movement thereof, a damping device fixed to said second lever to retard the motion imparted thereto by said first lever, and a switch operable upon movement of the control stick from its initial position to disconnect the altitude controller from the pilot system.

6. In an automatic pilot system having an elevator actuating motor, the combination of a pitch signal developing device, an inductive receiver for the pitch signals of said device, said receiver comprising a stator and a rotor winding, an altitude controller, electrical means interconnecting the receiver rotor and said altitude controller with the elevator actuating motor to operate the same in accordance with the pitch and altitude signals, a manually movable member adapted to move said rotor with respect to its stator upon movement thereof from an initial position, resilient means for returning said movable member to its initial position upon release thereof, and means connected to said movable member and said receiver rotor for retarding the movement of said rotor.

7. In an automatic pilot system having an elevator actuating motor, the combination of a pitch signal developing device, an inductive receiver for the pitch signals of said device, said receiver comprising a stator and a rotor winding, an altitude controller, electrical means interconnecting the receiver rotor and said altitude controller with the elevator actuating motor to operate the same in accordance with the pitch and altitude signals, a manually movable member adapted to move said rotor with respect to its stator upon movement thereof from an initial position, resilient means for returning said movable member to its initial position upon release thereof, means connected to said movable member and said receiver rotor for retarding the movement of said rotor, and means operable upon movement of said movable member from its initial position to disconnect said altitude controller.

8. An automatic pilot control system for aircraft, comprising a pair of inductive signal generator units each having a stator and a rotor element, a servomotor electrically controlled from the output of one of said units adapted for positioning a control surface of said aircraft, a position-maintaining device for positioning the rotor of the other of said units, the stator of the last-named unit being adapted to be fixed to the aircraft, manual control means for positioning one of the elements of said one unit whereby the attitude of the aircraft may be altered at will through said manual control means at a point remote from said position-maintaining means, displaceable motion retarding means connected with the positionable element of said one unit, and means connecting said motion retarding means for displacing the latter by said control means for retarding the positioning of said last-named positionable element to thereby overcome sudden attitude changes due to operation of said control means.

9. An automatic pilot control system for aircraft, comprising a pair of signal developing devices, each of said devices having a pair of relatively movable parts, a servomotor electrically controlled from the output of one of said devices adapted for positioning a control surface of said aircraft, a position-maintaining device for positioning one part of the other of said devices, the second part of the last-named device being adapted to be fixed to the aircraft, manual control means for positioning one of the parts of said one device whereby the attitude of the aircraft may be altered at will through said manual control means at a point remote from said position-maintaining means, displaceable time delay means connected with the positionable part of said one device, and means connecting said time delay means for displacement by said control means for retarding the positioning of said last-named positionable part to thereby overcome sudden attitude changes due to operation of said control means.

10. An automatic pilot control system for aircraft, comprising a pair of inductive signal generator units each having a stator and a rotor element, a servomotor electrically controlled from the output of one of said units adapted for positioning a control surface of said aircraft, a position-maintaining device for positioning one of the elements of the other of said units, the other of the elements of said last-named unit being adapted to be fixed to the aircraft, displaceable manual control means having a normally centered position which when displaced positions one of the elements of said one unit whereby the attitude of the aircraft may be altered at will through said manual control means at a point remote from said position-maintaining means, and means connected with the positionable element of said one unit and responsive to movement of said manual control means for retarding the movement imparted to the positionable element of said one unit by said manual control means.

11. An automatic pilot control system for aircraft, comprising a pair of signal developing devices, each of said devices having a pair of relatively movable parts, a servomotor electrically controlled from the output of said devices adapted for positioning a control surface of said aircraft, a position-maintaining device for positioning one part of one of said devices, the second part of the last-named device being adapted to be fixed to the aircraft, manual control means for positioning one of the parts of said other device whereby the attitude of the aircraft may be altered at will through said manual control means at a point remote from said position-maintaining means, and displaceable means associated with the positionable part of said other device and connected for movement by said manual control means for retarding the movement imparted to the positionable part of said other device by said manual control means.

12. An automatic pilot control system for aircraft, comprising a pair of signal developing devices, each of said devices having a pair of relatively movable parts, a servomotor electrically controlled from the output of said devices adapted for positioning a control surface of said aircraft, a position-maintaining device for positioning one part of one of said devices, the second part of the last-named device being adapted to be fixed to the aircraft, displaceable manual control means having a normally centered position which when displaced control the position of one of the parts of said other device whereby the attitude of the aircraft may be altered at will through said manual control means at a point remote from said position-maintaining means, an altitude controller connected with said servomotor adapted for maintaining a desired aircraft flight altitude level, and means operated by displacement of the manual control means from the normally centered position for disconnecting the altitude controller from said servomotor.

13. In a flight controller for an automatic pilot system having an elevator actuating motor and an altitude controller, the combination comprising a pitch signal developing device electrically connected with the altitude controller for operating said actuating motor, a manually movable member having a normally centered position which when displaced from its centered position operates said device, and means operative in response to displacement of said manually movable member for discontinuing operation of said motor by said altitude controller.

14. In a flight controller for an automatic pilot system having an elevator actuating motor together with an altitude controller adapted for maintaining craft flight at a predetermined altitude level, the combination comprising a variable pitch signal developing device for operating said motor, a manually movable member having a normally centered position which when displaced from its centered position operates said device, and means operative by displacement of said manually movable member for isolating said altitude controller and thereby rendering it ineffective on said motor.

FRANCIS HENRY S. ROSSIRE.

REFERENCES CITED

The following references are of record in the file of this patent:

UNITED STATES PATENTS

| Number | Name | Date |
|---|---|---|
| 1,415,003 | Sperry | May 2, 1922 |
| 1,418,335 | Sperry | June 6, 1922 |
| 2,125,361 | Schwarzler | Aug. 2, 1938 |
| 2,144,616 | Carlson | Jan. 24, 1939 |
| 2,396,951 | Horstmann | May 19, 1946 |
| 2,415,092 | Frische et al. | Feb. 4, 1947 |
| 2,415,430 | Frische et al. | Feb. 11, 1947 |
| 2,470,968 | Aske | May 24, 1949 |
| 2,474,618 | Divoll | June 28, 1949 |